United States Patent
Son et al.

(10) Patent No.: US 10,016,814 B2
(45) Date of Patent: Jul. 10, 2018

(54) CUTTING INSERT AND CUTTING TOOL ASSEMBLY INCLUDING THE SAME

(71) Applicant: TaeguTec Ltd., Dalseong-gun, Daegu (KR)

(72) Inventors: Min Hyuk Son, Daegu (KR); Seung Ho Cho, Daegu (KR)

(73) Assignee: TaeguTec Ltd., Dalseong-gun, Daegu (KR)

( * ) Notice: Subject to any disclaimer, the term of this patent is extended or adjusted under 35 U.S.C. 154(b) by 286 days.

(21) Appl. No.: 15/102,670

(22) PCT Filed: Dec. 22, 2014

(86) PCT No.: PCT/KR2014/012615
§ 371 (c)(1),
(2) Date: Jun. 8, 2016

(87) PCT Pub. No.: WO2015/099369
PCT Pub. Date: Jul. 2, 2015

(65) Prior Publication Data
US 2018/0133806 A1    May 17, 2018

(30) Foreign Application Priority Data
Dec. 27, 2013 (KR) .................. 10-2013-0165637

(51) Int. Cl.
*B23B 27/08*    (2006.01)
*B23B 29/04*    (2006.01)
(Continued)

(52) U.S. Cl.
CPC .......... *B23B 29/043* (2013.01); *B23B 27/086* (2013.01); *B23C 5/08* (2013.01);
(Continued)

(58) Field of Classification Search
CPC ..... B23B 27/04; B23B 27/086; B23B 29/043; B23B 29/06; B23B 29/12; B23B 2200/065; B23B 2205/02; B23C 5/08; B23C 5/2239
See application file for complete search history.

(56) References Cited

U.S. PATENT DOCUMENTS 4,992,007 A    2/1991  Satran
5,947,648 A    9/1999  Friedman et al.
(Continued)

FOREIGN PATENT DOCUMENTS

WO    WO 2011/159119    12/2011

OTHER PUBLICATIONS

International Search Report dated Mar. 26, 2015 issued in counterpart International (PCT) Application (No. PCT/KR2014/012615).

*Primary Examiner* — Alan Snyder
(74) *Attorney, Agent, or Firm* — Womble Bond Dickinson (US) LLP

(57) ABSTRACT

A cutting insert has parallel first upper and lower faces, parallel second upper and lower faces, first and second side faces, first and second cutting portions, and first and second mounting grooves. The second upper and lower faces are perpendicular to the first upper and lower faces, respectively. The first and second side faces are located at respective ends of the cutting insert. The first cutting portion has a major cutting edge at an edge between the first upper face and the first side face, while the second cutting portion has a major cutting edge at an edge between the second upper face and the second side face. The first mounting groove curvedly or linearly extends from the first cutting portion oppositely to the second cutting portion, while the second mounting groove curvedly or linearly extends from the second cutting portion oppositely to the first cutting portion.

20 Claims, 14 Drawing Sheets

(51) Int. Cl.
*B23B 29/06* (2006.01)
*B23C 5/08* (2006.01)
*B23C 5/22* (2006.01)

(52) U.S. Cl.
CPC ........ *B23C 5/2239* (2013.01); *B23B 2205/02* (2013.01); *B23C 2210/161* (2013.01)

(56) References Cited

U.S. PATENT DOCUMENTS

| | | |
|---|---|---|
| 2010/0061814 A1 | 3/2010 | Hecht |
| 2012/0269588 A1* | 10/2012 | Kaufmann ............... B23B 27/04 407/47 |
| 2013/0170917 A1 | 7/2013 | Hecht |
| 2015/0117971 A1* | 4/2015 | Eisen ..................... B23C 5/08 407/49 |

\* cited by examiner

[Fig. 1]
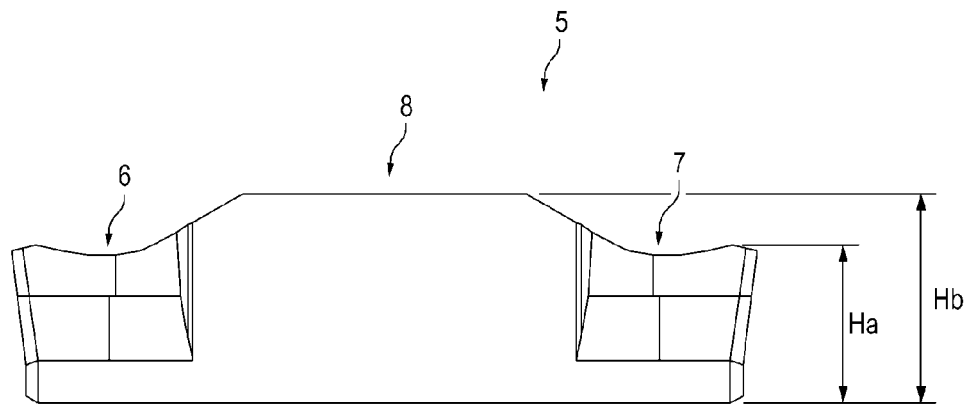
(PRIOR ART)
[Fig. 2]
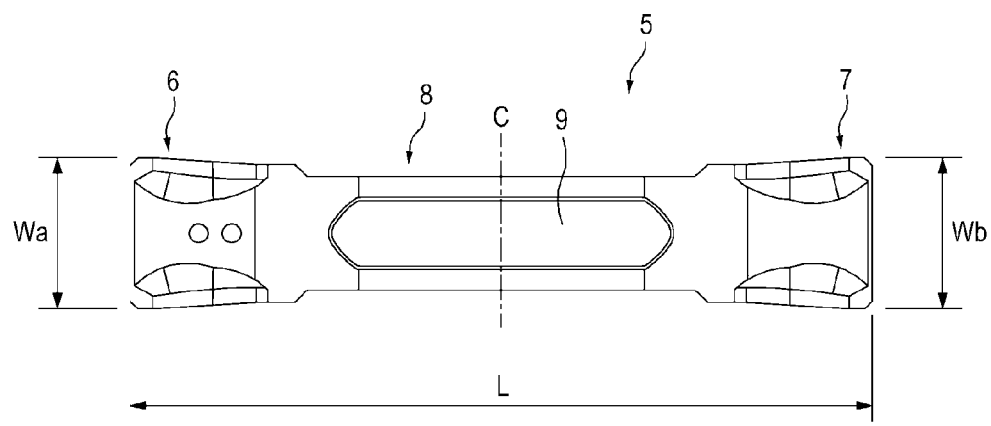
(PRIOR ART)

[Fig. 3]
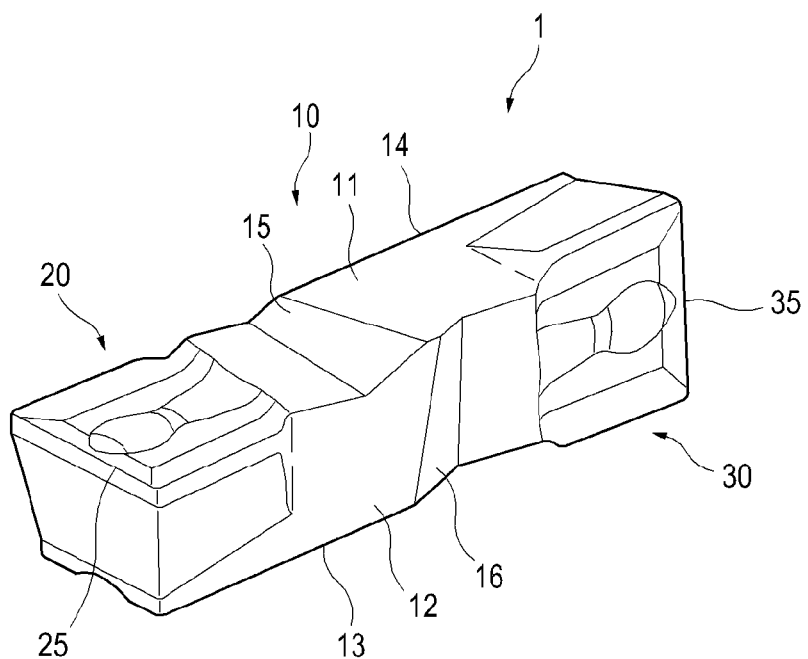
(PRIOR ART)

[Fig. 4]
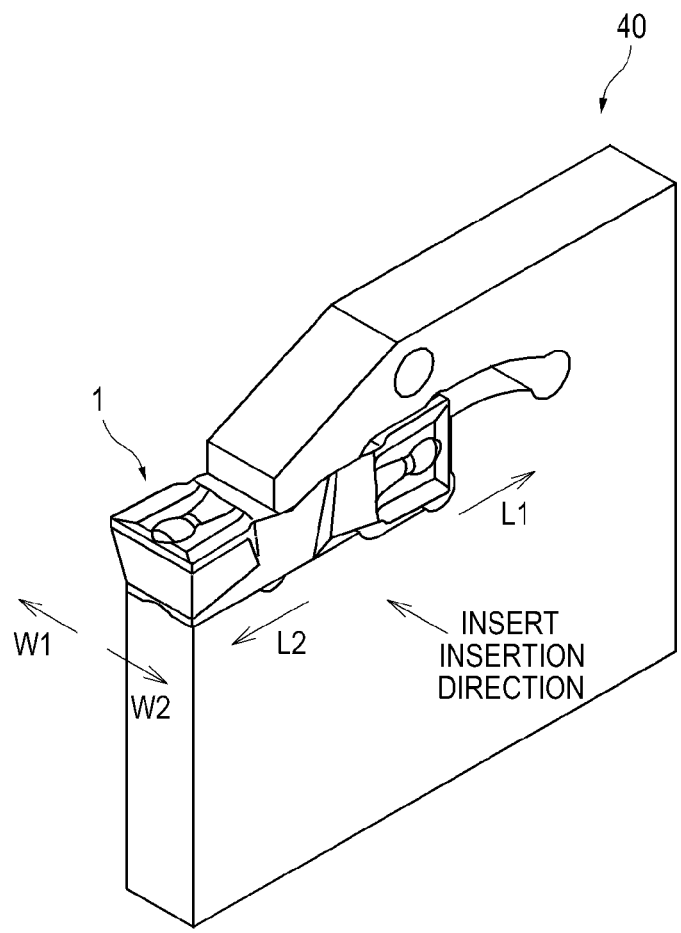
(PRIOR ART)

[Fig. 5]
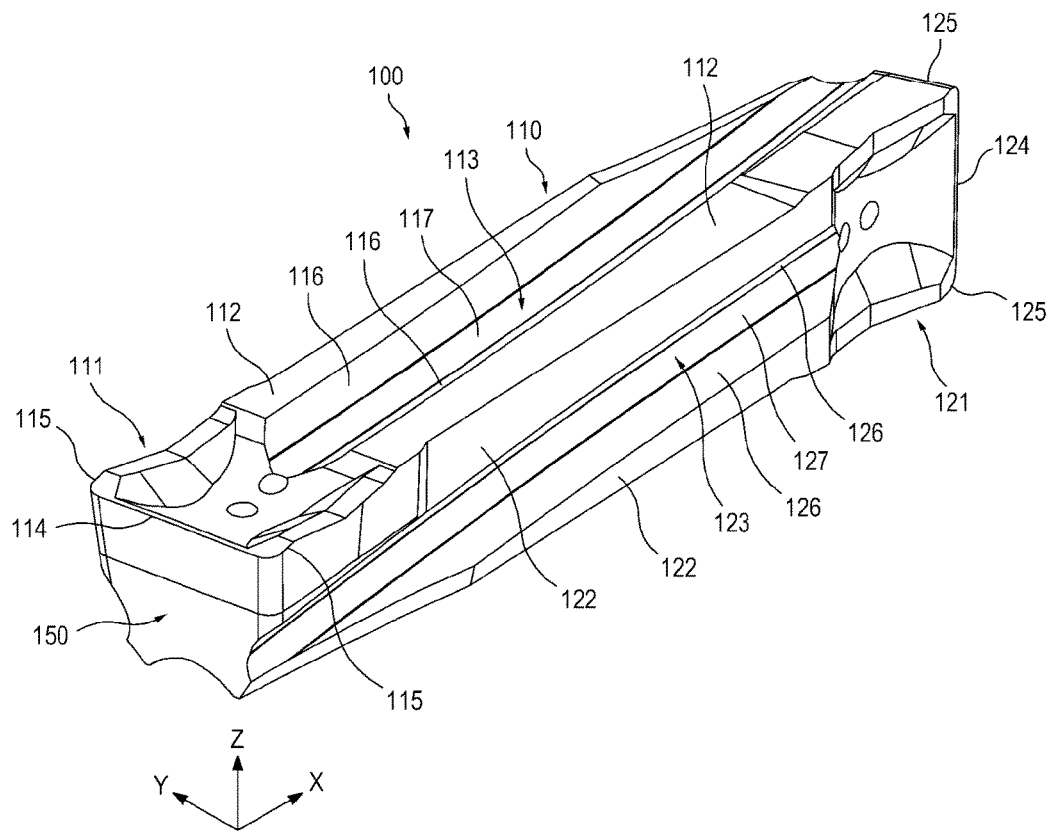
[Fig. 6]
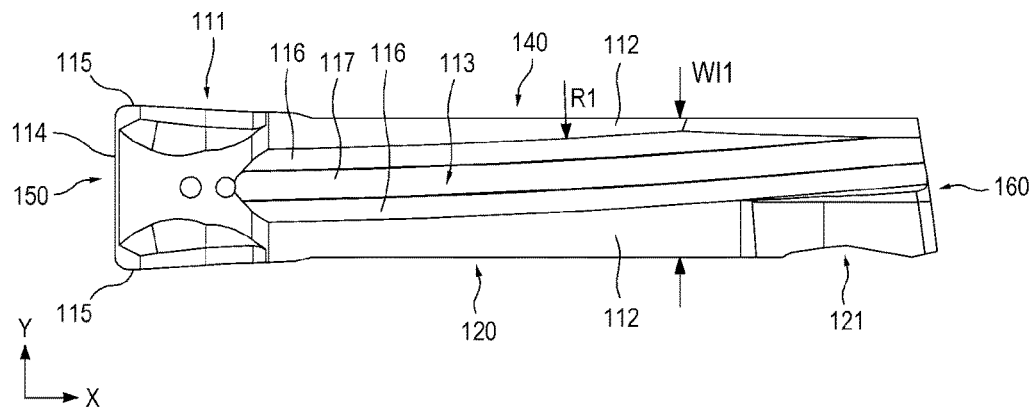

[Fig. 7]
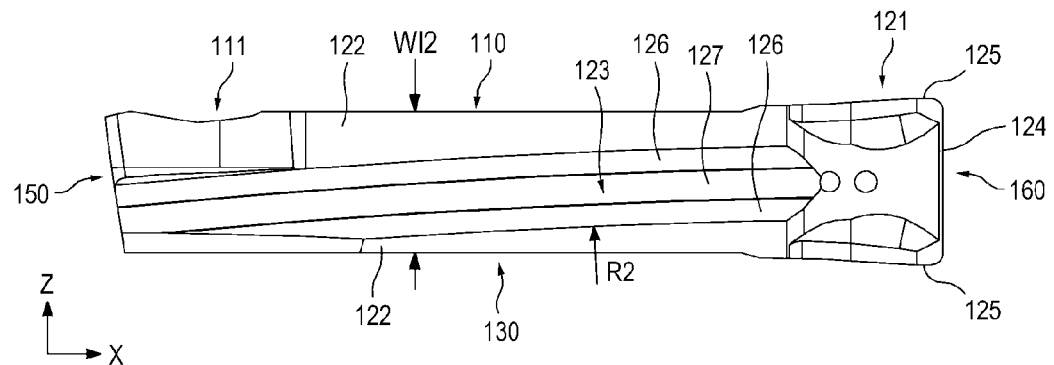
[Fig. 8]
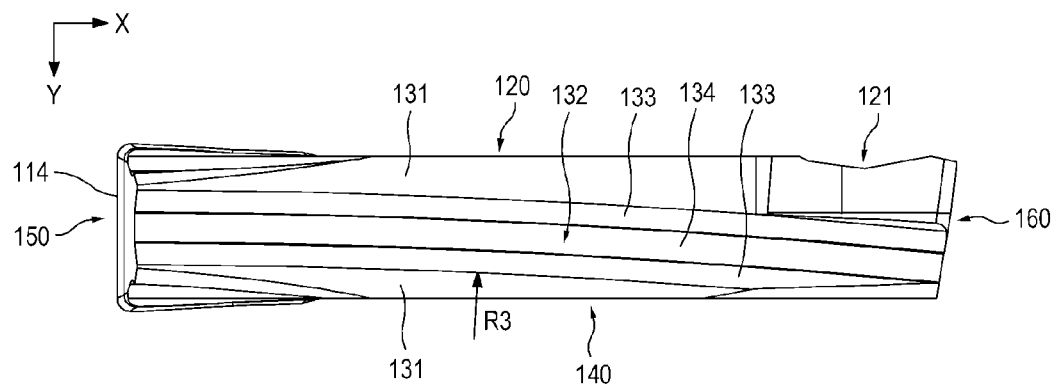
[Fig. 9]
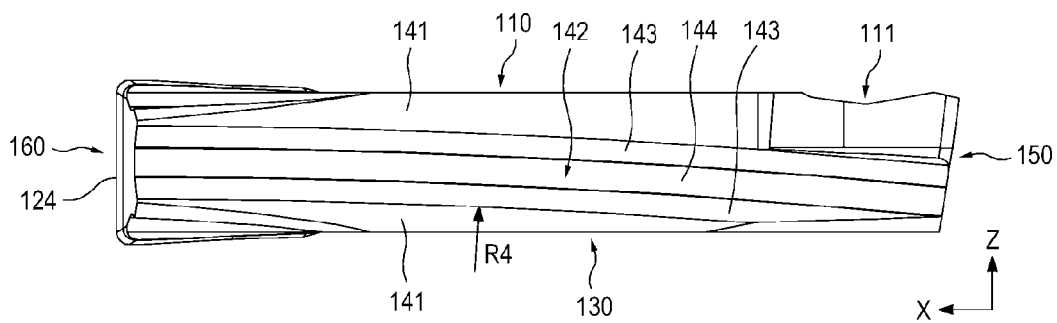

[Fig. 10]
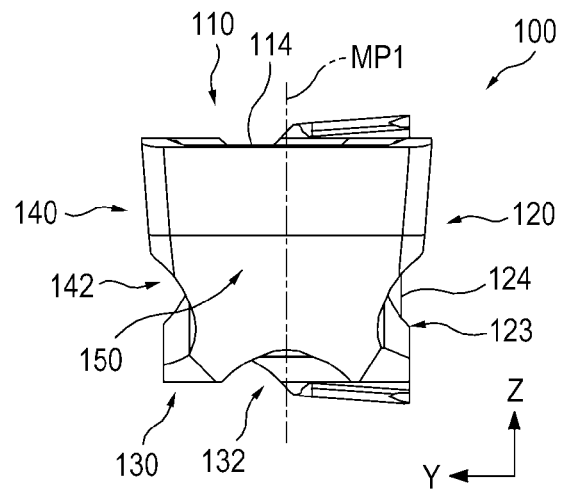
[Fig. 11]
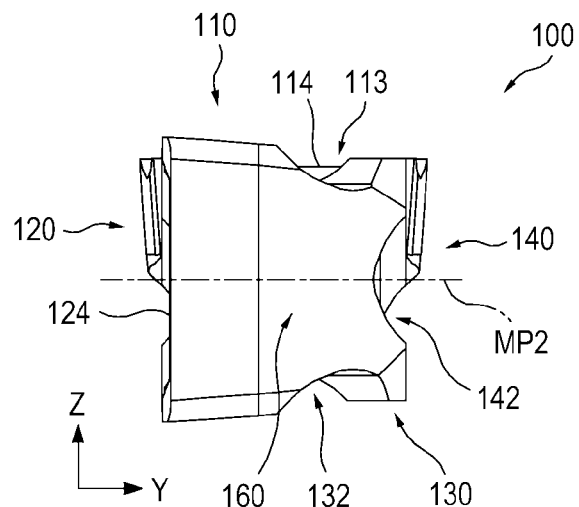

[Fig. 12]
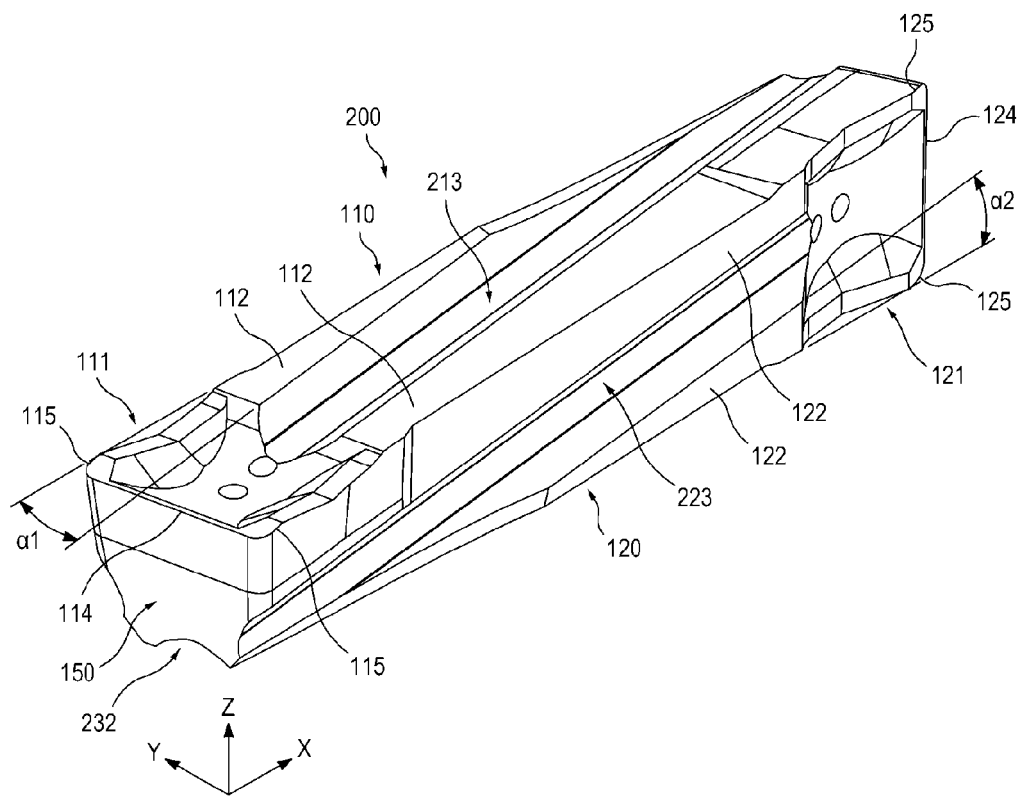

[Fig. 13]
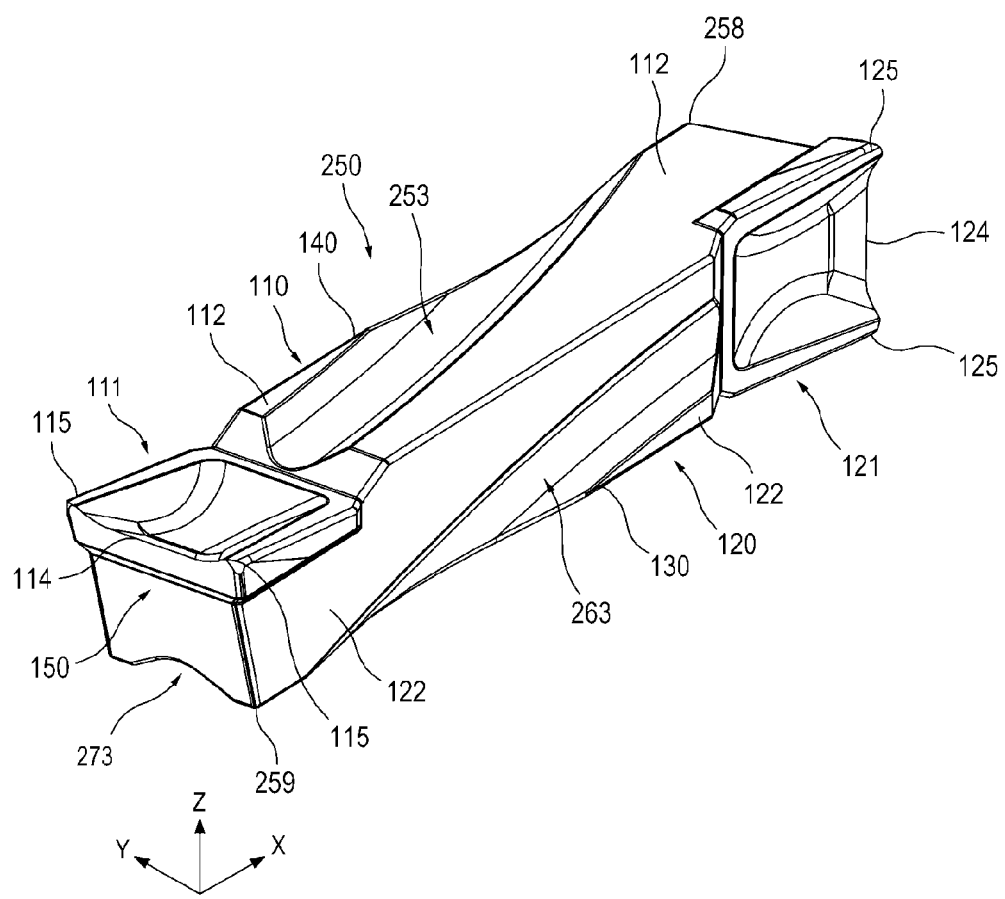

[Fig. 14]
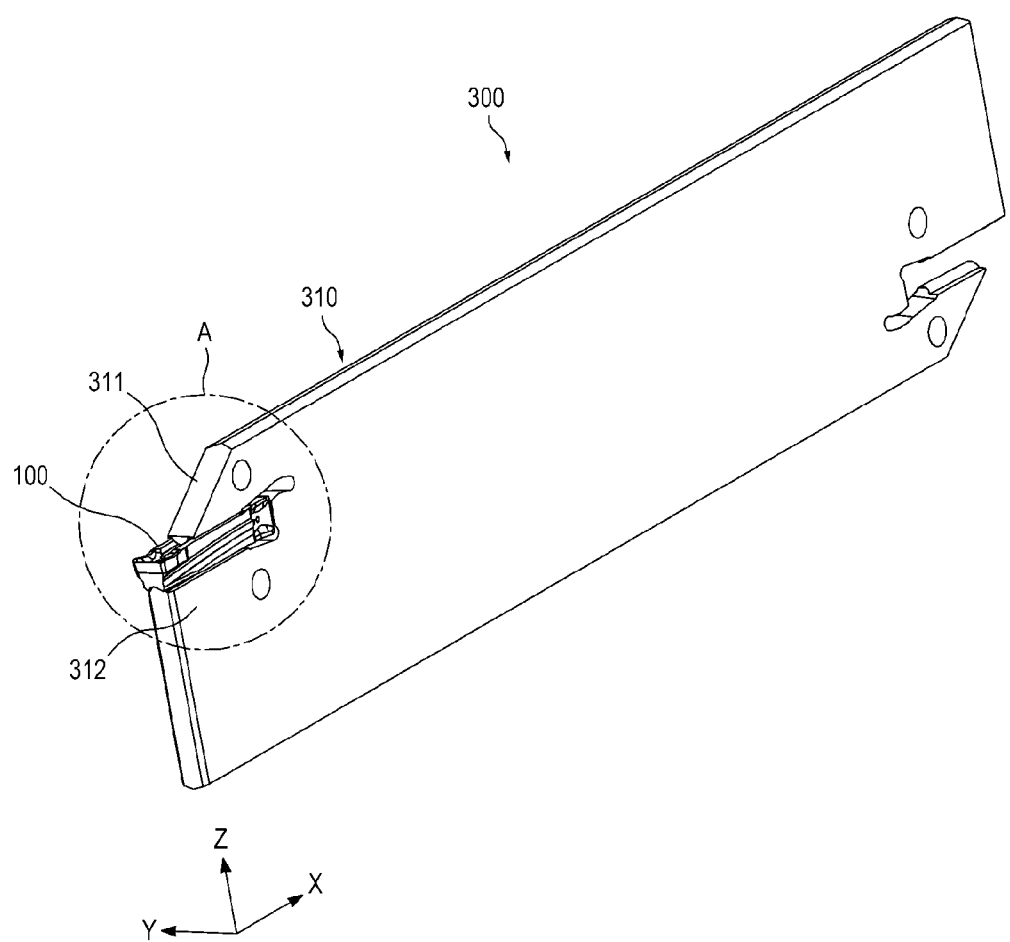

[Fig. 15]
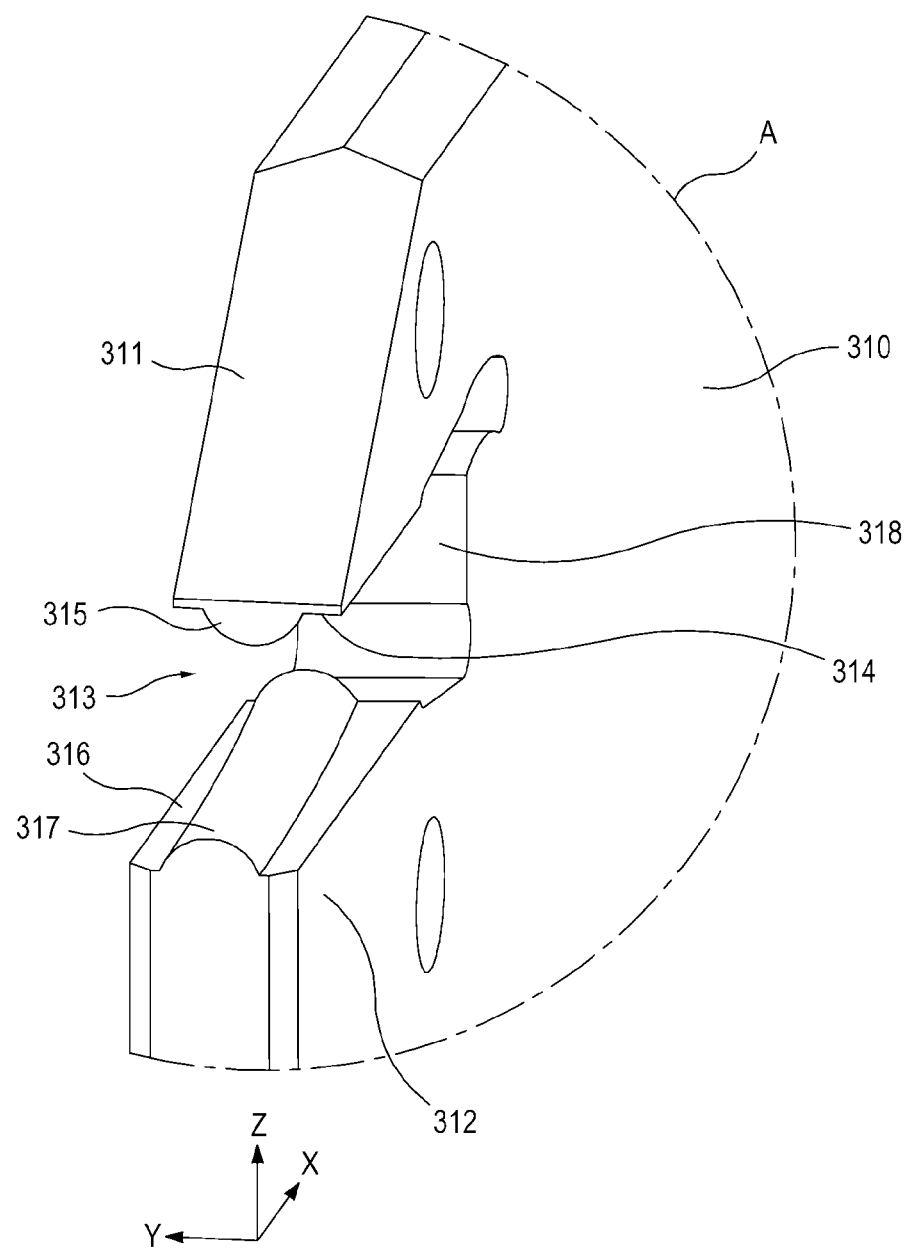

[Fig. 16]
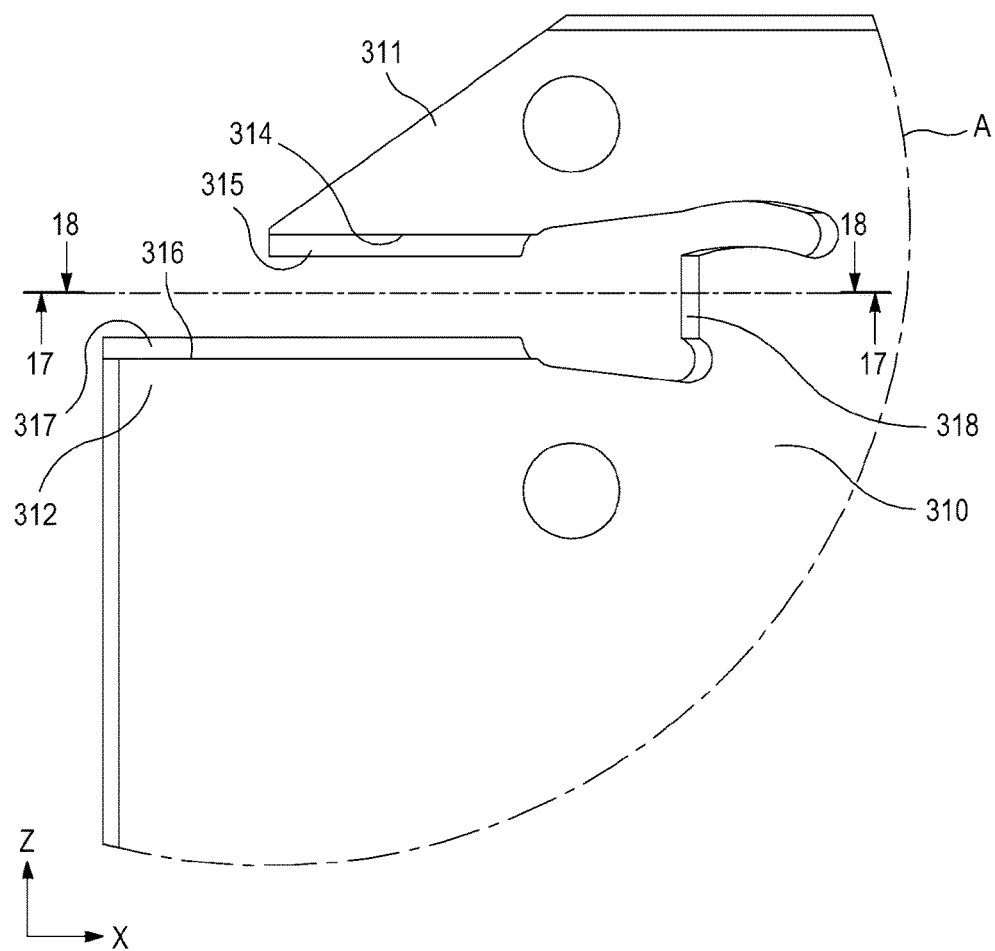
[Fig. 17]
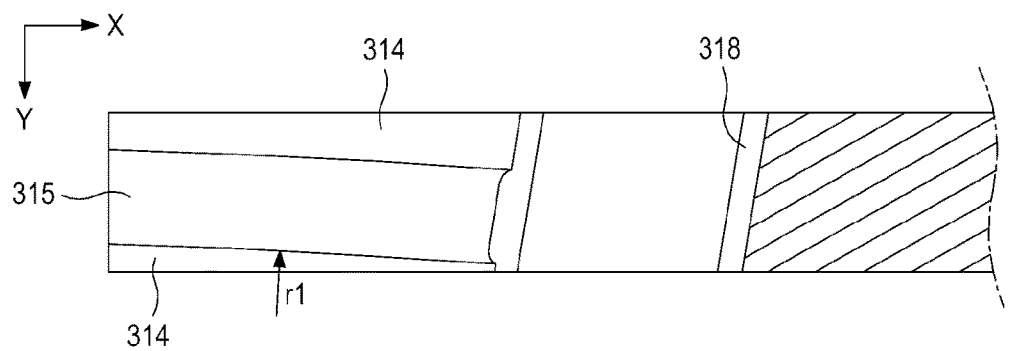

[Fig. 18]
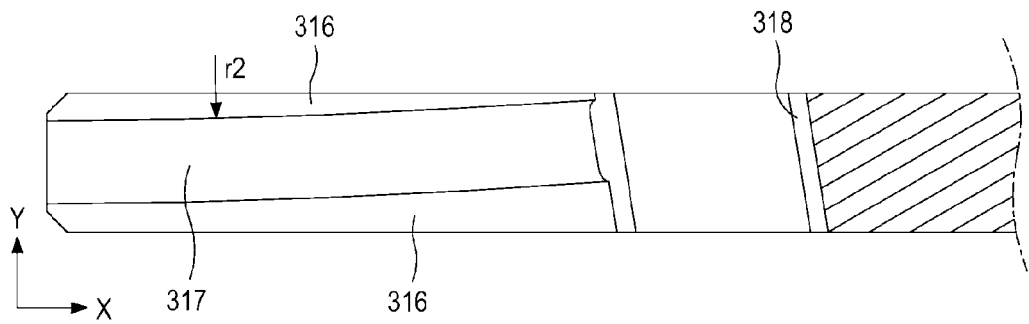
[Fig. 19]
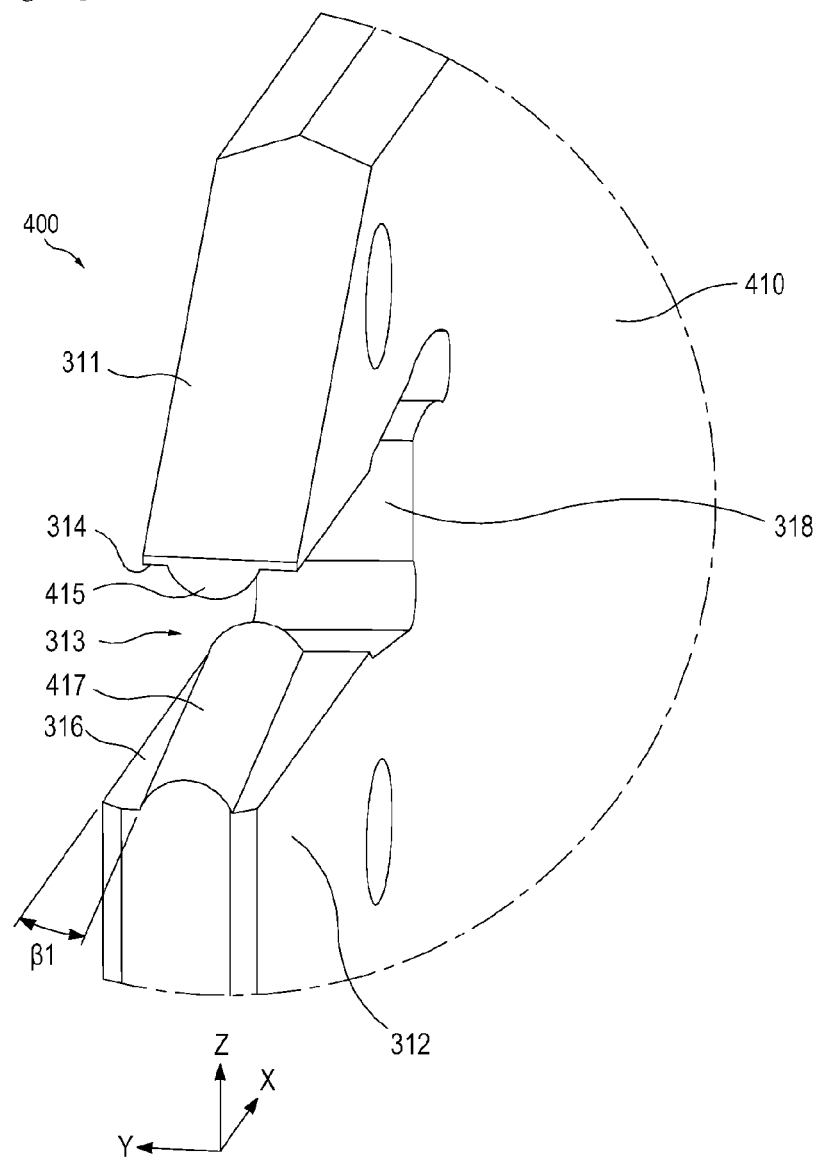

[Fig. 20]
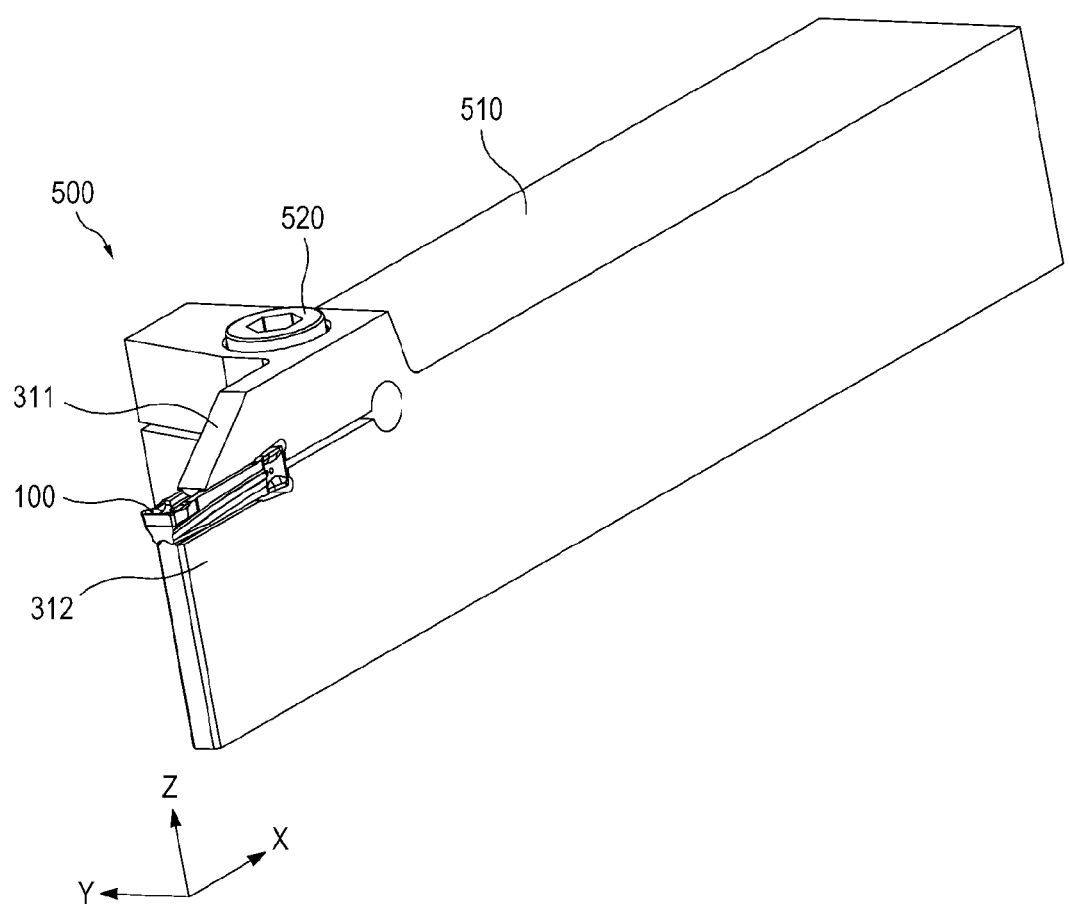

[Fig. 21]
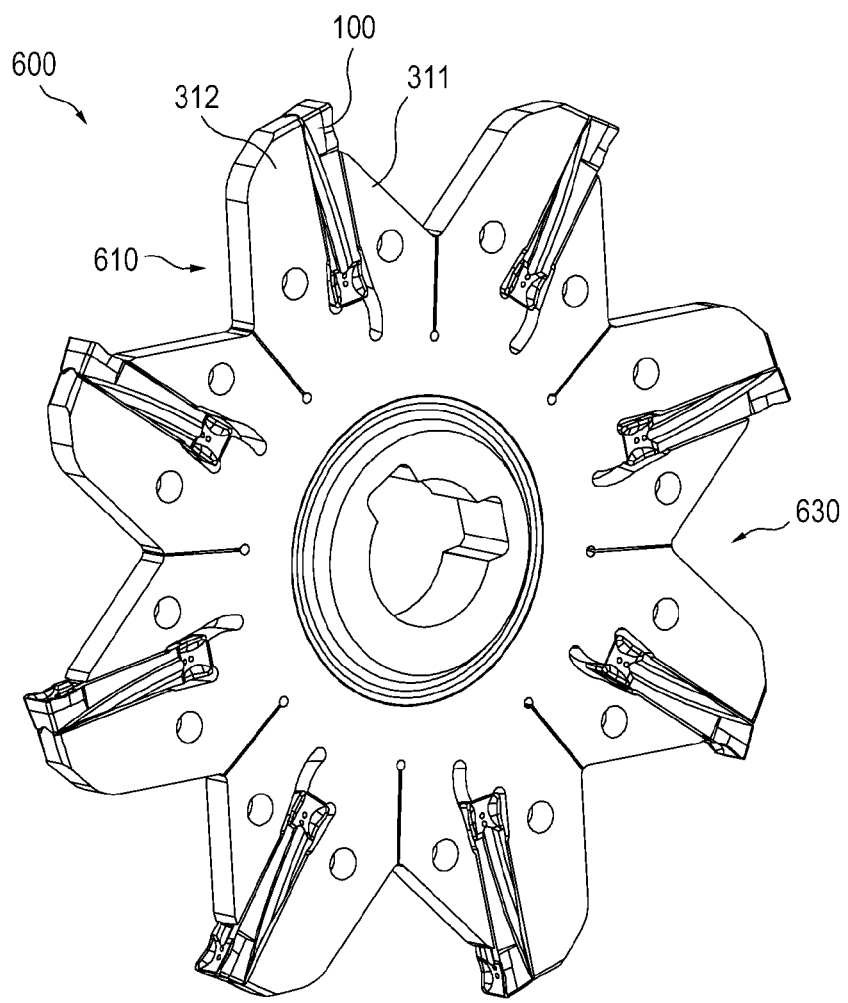

CUTTING INSERT AND CUTTING TOOL ASSEMBLY INCLUDING THE SAME

RELATED APPLICATIONS

This is a 35 USC 371 U.S. National Phase of International Application No. PCT/KR2014/012615, filed 2014 Dec. 22 and published as WO 2015/099369A1 on 2015-07-02, which claims priority to Korean application no. 10-2013-0165637, filed 2013 Dec. 27. The contents of the aforementioned applications are incorporated by reference in their entirety.

TECHNICAL FIELD

The present invention relates to a cutting insert and a cutting tool assembly including the same. More specifically, the present invention relates to a cutting insert, which is used for a deep groove cutting (e.g., grooving) and can be easily mounted and demounted, and a cutting tool assembly including such a cutting insert.

BACKGROUND

Cutting inserts for groove cutting are well known in the mechanical field. FIGS. 1 and 2 show one example of a cutting insert used for groove cutting. Referring to FIGS. 1 and 2, a cutting insert 5 has a first cutting portion 6, a second cutting portion 7 and a mounting portion 8. The first cutting portion 6 and the second cutting portion 7 are located on an upper face of the cutting insert 5 at respective longitudinal ends of the cutting insert 5. The first and second cutting portions 6 and 7 are mirror-symmetrical to each other about a center line C. Thus, a width Wa of an end of the first cutting portion 6 is equal to a width Wb of an end of the second cutting portion 7. The mounting portion 8 is higher than the first and second cutting portions 6 and 7 to prevent the first cutting portion 6 and the second cutting portion 7 from contacting a tool holder when mounting the cutting insert 5 to the tool holder. That is, a height Hb of the mounting portion 8 is greater than heights Ha of the first and second cutting portions 6 and 7. The mounting portion 8 has a mounting groove 9 formed in a longitudinal direction of the mounting portion 8. The mounting groove 9 engages a mounting protrusion of the tool holder.

FIG. 3 shows another example of a cutting insert used for groove cutting. FIG. 4 shows that the cutting insert shown in FIG. 3 is mounted to a tool holder. Referring to FIG. 3, the cutting insert 1 includes a body 10, which is centrally located, and first and second cutting portions 20 and 30, which are located at longitudinal ends of the body 10 respectively and have a substantially identical shape. The first cutting portion 20 and the second cutting portion 30 are located in different faces of the cutting insert 1. The body 10 has a first upper mounting surface 11, a second upper mounting surface 12 adjacent to the first upper mounting surface 11, a first lower mounting surface 13 opposite to the first upper mounting surface 11, and a second lower mounting surface 14 opposite to the second upper mounting surface 12. The first and second upper mounting surfaces 11 and 12 have receiving grooves 15 and 16, respectively. The receiving groove 15 is formed on the first upper mounting surface 11 in a width direction of the first upper mounting surface 11 and the receiving groove 16 is formed on the second upper mounting surface 12 in a width direction of the second upper mounting surface 12. Referring to FIG. 4, the cutting insert 1 is mounted to a tool holder 40 in an insert insertion direction shown in FIG. 4 (i.e., from a lateral surface of the tool holder 40). An upper support surface of the tool holder 40 engages the receiving groove 15 of the cutting insert 1 and a stopper formed on a lower support surface of the tool holder 40 engages a recess formed on the first lower mounting surface 13 of the cutting insert 1. When cutting a workpiece, a force applied to the cutting insert 1 in the longitudinal directions L1 and L2 is supported by the engagement between the receiving groove 15 and the upper support surface of the tool holder 40, while a force applied to the cutting insert 1 in the width directions W1 is supported by the engagement between the recess of the first lower mounting surface 13 and the stopper of the tool holder 40.

DISCLOSURE OF INVENTION

Technical Problem

In the cutting insert 5 shown in FIGS. 1 and 2, the width Wa of the first cutting portion 6 is equal to the width Wb of the second cutting portion 7. Thus, if the first cutting portion 6 cuts the workpiece deeper than the overall length L of the cutting insert 5, then the second cutting portion 7 may damage the surface of the workpiece cut by the first cutting portion 6. To avoid such damage, the depth of cut of the workpiece cannot but be limited significantly.

The cutting insert 1 shown in FIGS. 3 and 4 must be mounted to the tool holder 40 only in the insert insertion direction shown in FIG. 4 (i.e., only in the width direction W1). Thus, when the workpiece is cut, the force applied to the cutting insert 1 in the width direction W2 is not effectively supported. As a result, the cutting insert 1 may be separated from the tool holder 40 during the cutting operation on the workpiece.

To solve the aforementioned problems, the present invention provides a cutting insert which prevents the second cutting portion from damaging the cut surface of a workpiece when the first cutting portion cuts the workpiece, as well as a cutting tool assembly including such a cutting insert.

Further, the present invention provides a cutting insert, which can support the force acting in a direction perpendicular to a longitudinal direction of the cutting insert when mounted to the tool holder, as well as a cutting tool assembly.

Solution to Problem

One aspect of the present invention provides a cutting insert. A cutting insert according to one embodiment includes: a first upper face and a first lower face parallel to each other; a second upper face and a second lower face parallel to each other and perpendicular to the first upper face and the first lower face respectively; a first side face located at one end of the first upper face, the first lower face, the second upper face and the second lower face; a second side face located at the other end of the first upper face, the first lower face, the second upper face and the second lower face; a first cutting portion including a first major cutting edge formed at an edge between the first upper face and the first side face; a second cutting portion including a second major cutting edge formed at an edge between the second upper face and the second side face; a first mounting groove extending on the first upper face from the other end of the first cutting portion oppositely to the second cutting portion along a longitudinal direction of the first upper face; and a second mounting groove extending on the second upper face from one end of the second cutting portion oppositely to the first cutting portion along a longitudinal direction of the second upper face.

In one embodiment, the first mounting groove curvedly extends from the other end of the first upper cutting portion toward a corner between the second lower face and the second side face. The second mounting groove curvedly extends from the one end of the second cutting portion toward a corner between the first lower face and the first side face.

In one embodiment, the first mounting groove linearly extends from the other end of the first cutting portion toward a corner between the second lower face and the second side face at an inclined angle α1 with respect to the second lower face. The second mounting groove linearly extends from the one end of the second cutting portion toward a corner between the first lower face and the first side face at an inclined angle α2 with respect to the lower face.

In one embodiment, the first mounting groove curvedly extends from the other end of the first cutting portion toward the second lower face. The second mounting groove curvedly extends from the one end of the second cutting portion toward the first lower face.

In one embodiment, the cutting insert further includes: a third mounting groove extending on the first lower face from the one end of the first lower face along a longitudinal direction of the first lower face; and a fourth mounting groove extending on the second lower face from the other end of the second lower face along a longitudinal direction of the second lower face.

In one embodiment, the first mounting groove has a cross-sectional shape having a curve. The first mounting groove includes: a pair of first curved surfaces having a radius of curvature; and a second curved surface located between the pair of first curved surfaces and having a radius of curvature less than the radius of curvature of the first curved surface.

In one embodiment, the second mounting groove has a cross-sectional shape having a curve. The second mounting groove includes: a pair of first curved surfaces having a radius of curvature; and a second curved surface located between the pair of first curved surfaces and having a radius of curvature less than the radius of curvature of the first curved surface.

In one embodiment, the first cutting portion further includes first minor cutting edges extending from respective ends of the first major cutting edge along an edge between the first upper face and the second upper face and an edge between the first upper face and the second lower face. The first minor cutting edge forms an acute angle with respect to the first major cutting edge.

In one embodiment, the second cutting portion further includes second minor cutting edges extending from respective ends of the second major cutting edge along an edge between the second upper face and the first upper face and an edge between the second upper face and the first lower face. The second minor cutting edge forms an acute angle with respect to the second major cutting edge.

In one embodiment, a width of the cutting insert at the first major cutting edge is greater than a width of the cutting insert at the first upper face where the first cutting portion is not located.

Another aspect of the present invention provides a cutting tool assembly. A cutting tool assembly according to one embodiment includes the cutting insert according to one embodiment and a tool holder configured to clamp the cutting insert. The tool holder includes: an upper clamp downwardly pressing the first upper face of the cutting insert and having a first mounting protrusion engaging the first mounting groove; a lower clamp supporting the first lower surface of the cutting insert; and an insert pocket receiving the cutting insert between the upper clamp and the lower clamp.

In one embodiment, the first mounting protrusion downwardly protrudes from a bottom surface of the upper clamp and extends along a longitudinal direction of the bottom surface of the upper clamp.

In one embodiment, the cutting insert further includes a third mounting groove extending from the one end of the first lower face along a longitudinal direction of the first lower surface. The lower clamp includes a second mounting protrusion engaging the third mounting groove of the cutting insert.

In one embodiment, the second mounting protrusion upwardly protrudes from a top surface of the lower clamp and extends along a longitudinal direction of the top surface of the lower clamp.

In one embodiment, the cutting tool assembly further includes a set screw positioned perpendicularly to a top surface of the upper clamp. The set screw presses the upper clamp downwardly.

In one embodiment, the cutting tool assembly is a slotting cutter. The slotting cutter includes a cutter body having a plurality of the tool holders.

Advantageous Effects of Invention

The first cutting portion is located at the left side of the first upper face and the second cutting portion is located at the right side of the second upper face perpendicular to the first upper face. As such, the width at the left end of the first upper face is greater than the width of the right end of the first upper face. Thus, the surface of the workpiece cut by the first cutting portion is not damaged by the second cutting portion. Further, the first mounting groove is formed on the first upper face along the longitudinal direction of the cutting insert throughout the overall length except the first cutting portion. Thus, the cutting insert can be easily mounted to and demounted from the tool holder. The first to fourth mounting grooves of the cutting insert and the first and second mounting protrusions of the tool holder are curved or inclined with respect to adjacent faces. Thus, the force applied to the cutting insert in a direction perpendicular to the longitudinal direction of the cutting insert can be effectively supported during the cutting operation on the workpiece. Further, the cutting insert can be prevented from being separated from the tool holder during the cutting operation on the workpiece.

BRIEF DESCRIPTION OF DRAWINGS

FIG. 1 is a front view of a prior art cutting insert.

FIG. 2 is a top view of the cutting insert shown in FIG. 1.

FIG. 3 is a perspective view of another prior art cutting insert.

FIG. 4 is a perspective view showing that the cutting insert shown in FIG. 3 is mounted to a tool holder.

FIG. 5 is a perspective view of a cutting insert according to a first embodiment.

FIG. 6 is a top view of the cutting insert shown in FIG. 5.

FIG. 7 is a front view of the cutting insert shown in FIG. 5.

FIG. 8 is a bottom view of the cutting insert shown in FIG. 5.

FIG. 9 is a rear view of the cutting insert shown in FIG. 5.

FIG. 10 is a left side view of the cutting insert shown in FIG. 5.

FIG. 11 is a right side view of the cutting insert shown in FIG. 5.

FIG. 12 is a perspective view of a cutting insert according to a second embodiment.

FIG. 13 is a perspective view of a cutting insert according to a third embodiment.

FIG. 14 is a perspective view of a cutting tool assembly according to a first embodiment.

FIG. 15 is an enlarged perspective view showing an A portion shown in FIG. 14.

FIG. 16 is an enlarged side view showing an A portion shown in FIG. 14.

FIG. 17 is a sectional view taken along the line 17-17 shown in FIG. 16.

FIG. 18 is a sectional view taken along the line 18-18 shown in FIG. 16.

FIG. 19 is a partial perspective view of a cutting tool assembly according to a second embodiment.

FIG. 20 is a perspective view of a cutting tool assembly according to a third embodiment.

FIG. 21 is a perspective view of a cutting tool assembly according to a fourth embodiment.

MODE FOR THE INVENTION

Descriptions will be made as to embodiments of a cutting insert and a cutting tool assembly with reference to the accompanying drawings. Like or corresponding elements or components in the accompanying drawings are denoted by the same reference numeral. In the below description, explanation or description on like or corresponding elements or components is made in relation to a first embodiment and is then omitted in relation to embodiments to be described subsequently to the first embodiment.

The accompanying drawings show a 3-dimensional Cartesian coordinate system (X axis, Y axis and Z axis). Hereinafter, a positive X-axial direction, a positive Y-axial direction and a positive Z-axial direction refer to a rightward direction, a rearward direction and an upward direction, respectively. Further, a negative X-axial direction, a negative Y-axial direction and a negative Z-axial direction refer to a leftward direction, a frontward direction and a downward direction, respectively.

A cutting insert 100 according to a first embodiment is described with reference to FIGS. 5 to 11. Referring to FIGS. 5 to 9, the cutting insert 100 has a shape of an approximately rectangular parallelepiped extending in the positive X-axial direction. The cutting insert 100 includes a first upper face 110, a second upper face 120, a first lower face 130, a second lower face 140, a first side face 150 and a second side face 160. In this embodiment, the first upper face 110 is located upward, while the first lower face 130 is located downward. The first upper face 110 and the first lower face 130 are parallel with each other and are located opposite each other in the cutting insert 100. The second upper face 120 is located frontward, while the second lower face 140 is located rearward. The second upper face 120 and the second lower face 140 are perpendicular to the first upper face 110 and the first lower face 130. The second upper face 120 and the second lower face 140 are parallel with each other and are located opposite each other in the cutting insert 100. The first side face 150 is located at the left end of the cutting insert 100 and the second side face 160 is located at the right end of the cutting insert 100. Further, one end of the cutting insert 100 refers to the left end, while the other end of the cutting insert 100 refers to the right end. In some embodiment, the second upper face 120 may be located rearward, while the second lower face 140 may be located frontward.

As shown in FIGS. 5 and 6, the first upper face 110 includes a first cutting portion 111, a first mounting surface 112 and a first mounting groove 113. The first cutting portion 111 is located at the left side of the first upper face 110 and includes a first major cutting edge 114 and a pair of first minor cutting edges 115. The first major cutting edge 114 is formed at the left end of the first upper face 110. The pair of first minor cutting edges 115 extend rightward from front and rear ends of the first major cutting edge 114, respectively. In the first cutting portion 111, the first major cutting edge 114 is formed at the edge between the first upper face 110 and the first side face 150, and the first minor cutting edges 115 are formed at the edge between the first upper face 110 and the second upper face 120 and the edge between the first upper face 110 and the second lower face 140, respectively.

As shown in FIG. 6, when viewing the cutting insert 100 from the top, the first minor cutting edges 115 form an acute angle with respect to the first major cutting edge 114. Thus, the width between the pair of the first minor cutting edges 115 gradually decreases toward the right side. This prevents the surface of a workpiece, which is cut by the first major cutting edge 114 as well as the left ends of the first minor cutting edges 115, from being damaged by the rest of the first minor cutting edges 115. Accordingly, the cutting insert 100 according to the first embodiment is capable of deeply cutting the workpiece.

The first mounting surface 112 comprises a flat surface. When viewing the cutting insert 100 from the top, the width WI1 between the second upper face 120 and the second lower face 140 is constant at the first mounting surface 112. Further, the width WI1 is narrower than the narrowest width of the cutting insert 100 at the first minor cutting edges 115 (the width of the cutting insert 100 at the first cutting portion 111). Further, the width of the cutting insert 100 at the first major cutting edge 114 is greater than the width WI1 of the cutting insert 100 at the first upper face 110 where the first cutting portion 111 is not located. Thus, the surface of the workpiece, which is cut by the first major cutting edge 114 and the left ends of the first minor cutting edges 115, can be prevented from being damaged by the second upper face 120 and the second lower face 140. Accordingly, the cutting insert 100 according to the first embodiment is capable of deeply cutting the workpiece.

The first mounting groove 113 extends on the first upper face 110 from the right end of the first cutting portion 111 oppositely to the second cutting portion 121 along the longitudinal direction of the first upper face 110 (toward the second lower face 140). The left end of the first mounting groove 113 adjoins the right end of the first cutting portion 111. The first mounting groove 113 curvedly extends from the right end of the first cutting portion 111 toward the corner where the second lower face 140 and the second side face 160 meet. The right end of the first mounting groove 113 is located at the corner where the second lower face 140 and the second side face 160 meet. The first mounting groove 113 is curved with a predetermined radius of curvature R1. To avoid the interference with the second cutting portion 121 located at the right side of the second upper face 120, the center of said radius of curvature R1 is preferably located rearward. Further, the first mounting groove 113 has a cross-sectional shape having a downwardly concave curve. When viewing the cutting insert 100 from the side, the first mounting groove 113 has a pair of first curved surfaces 116, which have a relatively greater radius of curvature, and a second curved surface 117, which is located between the pair of the first curved surfaces 116 and has a radius of curvature less than that of the first curved surface 116.

As shown in FIG. 7, the second upper face 120 includes the second cutting portion 121, a second mounting surface 122 and a second mounting groove 123. The second cutting portion 121 is located at the right side of the second upper face 120 and includes a second major cutting edge 124 and a pair of second minor cutting edges 125. The second major cutting edge 124 is formed at the right end of the second upper face 120. The pair of second minor cutting edges 125 extend leftward from upper and lower ends of the second major cutting edge 124, respectively. In the second cutting portion 121, the second major cutting edge 124 is formed at the edge between the second upper face 120 and the second side face 160, and the second minor cutting edges 125 are formed at the edge between the second upper face 120 and the first upper face 110 and the edge between the second upper face 120 and the first lower face 130 respectively. In some embodiment wherein the second upper face 120 is located rearward and the second lower face 140 is located frontward, the second cutting portion may be located at the right side of the rearward face, the second major cutting edge may be located at the edge between the rearward surface and the second side face 160, and the second minor cutting edges may be respectively located at the edge between the rearward surface and the first upper face 110 and the edge between the rearward face and the first lower face 130.

As shown in FIG. 7, when viewing the cutting insert 100 from the front, the second minor cutting edges 125 form an acute angle with respect to the second major cutting edge 124. Thus, the width between the pair of the second minor cutting edges 125 gradually decreases toward the left side. This can prevent the surface of a workpiece, which is cut by the second major cutting edge 124 as well as the right ends of the second minor cutting edges 125, from being damaged by the rest of the second minor cutting edges 125.

The second mounting surface 122 comprises a flat surface. When viewing the cutting insert 100 from the front, the width WI2 between the first upper face 110 and the first lower face 130 is constant at the second mounting surface 122. Further, the width WI2 is narrower than the narrowest width of the cutting insert 100 at the second minor cutting edges 125 (the width of the cutting insert 100 at the second cutting portion 121). Further, the width of the cutting insert 100 at the second major cutting edge 124 is greater than the width WI2 of the cutting insert 100 at the second upper face 120 where the second cutting portion 121 is not located. Thus, the surface of the workpiece, which is cut by the second major cutting edge 124 and the right ends of the second minor cutting edges 125, can be prevented from being damaged by the first upper face 110 and the first lower face 130.

The second mounting groove 123 extends on the second upper face 120 from the left end of the second cutting portion 121 oppositely to the first cutting portion 111 along the longitudinal direction of the second upper face 120 (toward the first lower face 130). The right end of the second mounting groove 123 adjoins the left end of the second cutting portion 121. The second mounting groove 123 curvedly extends from the left end of the second cutting portion 121 toward the corner where the first lower face 130 and the first side face 150 meet. The left end of the second mounting groove 123 is located at the corner where the first lower face 130 and the first side face 150 meet. The second mounting groove 123 is curved with a predetermined radius of curvature R2. To avoid the interference with the first cutting portion 111 located at the left side of the first upper face 110, the center of said radius of curvature R2 is preferably located downward. Further, the second mounting groove 123 has a cross-sectional shape having a rearward concave curve. When viewing the cutting insert 100 from the side, the second mounting groove 123 has a pair of first curved surfaces 126, which have a relatively greater radius of curvature, and a second curved surface 127, which is located between the pair of the first curved surfaces 126 and has a radius of curvature less than that of the first curved surface 126.

As shown in FIGS. 5, 7, 8 and 10, the first lower face 130 includes a third mounting surface 131 and a third mounting groove 132. The third mounting surface 131 comprises a flat surface which is parallel with the first mounting surface 112. The third mounting groove 132 curvedly extends on the first lower face 130 from the left end of the cutting insert 100 to the right end of the cutting insert 100. The left end of the third mounting groove 132 is located at the middle of the first lower face 130 in the width direction of the first lower face 130, while the right end of the third mounting groove 132 is located at the corner where the second lower face 140 and the second side face 160 meet. The third mounting groove 132 is curved with a predetermined radius of curvature R3. To avoid the interference with the second cutting portion 121 located at the right side of the second upper face 120, the center of said radius of curvature R3 is preferably located rearward. Further, the third mounting groove 132 has a cross-sectional shape having an upwardly concave curve. When viewing the cutting insert 100 from the side, the third mounting groove 132 has a pair of first curved surfaces 133, which have a relatively greater radius of curvature, and a second curved surface 134, which is located between the pair of the first curved surfaces 133 and has a radius of curvature less than that of the first curved surface 133. A portion of the third mounting groove 132 is mirror-symmetrical to the first mounting groove 113 relative to a median plane MP1 bisecting the first upper face 110 and the first lower face 130. Thus, the radiuses of curvature of the third mounting groove 132, the first curved surface 133 and the second curved surface 134 are equal to the radiuses of curvature of the first mounting groove 113, the first curved surface 116 and the second curved surface 117, respectively.

As shown in FIGS. 5, 6, 9 and 11, the second lower face 140 includes a fourth mounting surface 141 and a fourth mounting groove 142. The fourth mounting surface 141 comprises a flat surface which is parallel with the second mounting surface 122. The fourth mounting groove 142 curvedly extends on the second lower face 140 from the right end of the cutting insert 100 to the left end of the cutting insert 100. The right end of the fourth mounting groove 142 is located at the middle of the second lower face 140 in the width direction of the second lower face 140, while the left end of the fourth mounting groove 142 is located at the corner where the first lower face 130 and the first side face 150 meet. The fourth mounting groove 142 is curved with a predetermined radius of curvature R4. To avoid interference with the first cutting portion 111 located at the left side of the first upper face 110, the center of said radius of curvature R4 is preferably located downward. Further, the fourth mounting groove 142 has a cross-sectional shape having a frontward concave curve. When viewing the cutting insert 100 from the side, the fourth mounting groove 142 has a pair of first curved surfaces 143, which have a relatively greater radius of curvature, and a second curved surface 144, which is located between the pair of the first curved surfaces 143 and has a radius of curvature less than that of the first curved surface 143. A portion of the fourth mounting groove 142 is mirror-symmetrical to the second mounting groove 123 relative to a median plane MP2 bisecting the second upper face 120 and the second lower face 140. Thus, the radiuses of curvature of the fourth mounting groove 142, the first curved surface 143 and the second curved surface 144 are equal to the radiuses of curvature of the second mounting groove 123, the first curved surface 126 and the second curved surface 127, respectively.

As shown in FIG. 7, the first side face 150 forms an acute angle with respect to the first upper face 110 such that the first major cutting edge 114 can have a relief angle when the first major cutting edge 114 cuts the workpiece. As shown in FIG. 6, the second side face 160 forms an acute angle with respect to the second upper face 120 such that the second major cutting edge 124 can have a relief angle when the second major cutting edge 124 cuts the workpiece.

As shown in FIG. 10, in the first cutting portion 111, the second upper face 120 and the second lower face 140 form an acute angle with respect to the first upper face 110 such that the first minor cutting edges 115 can have a relief angle when the first minor cutting edges 115 cut the workpiece. As shown in FIG. 11, in the second cutting portion 121, the first upper face 110 and the first lower face 130 form an acute angle with respect to the second upper face 120 such that the second minor cutting edges 125 can have a relief angle when the second minor cutting edges 125 cut the workpiece.

As shown in FIGS. 10 and 11, when viewing the cutting insert 100 from the first side face 150 or the second side face 160, the first major cutting edge 114 of the first cutting portion 111 and the second major cutting edge 124 of the second cutting portion 121 are perpendicular to each other. Thus, when the first cutting portion 111 cuts the workpiece, the second cutting portion 121 does not come into contact with the cut surface of the workpiece.

The cutting insert 100 is mounted to a tool holder 310 in such a manner that the first upper face 110 and the first lower face 130 makes one pair or the second upper face 120 and the second lower face 140 makes another pair. Where the first cutting portion 111 is used for cutting the workpiece, the second cutting portion 121 is not used for cutting the workpiece and further does not disturb the cutting operation performed by the first cutting portion 111. When replacing the first cutting portion 111, the cutting insert 100 is mounted to the tool holder 310 such that the second upper face 120 faces upward and the second side face 160 is positioned at the left side. In this case, the second cutting portion 121 is used for cutting the workpiece, but the first cutting portion 111 is not used for cutting the workpiece and further does not disturb the cutting operation performed by the second cutting portion 121.

As described above, the first mounting groove 113 and the third mounting groove 132 are curvedly formed along the longitudinal direction of the cutting insert 100. Thus, the cutting insert 100 is inserted to an insert pocket 313 of the tool holder 310 (see FIG. 15) along the longitudinal direction of the cutting insert 100 and is then mounted and fixed to the tool holder 310. Accordingly, the cutting insert 100 can be quickly and easily mounted and fixed to the tool holder 310. Further, the curved first mounting groove 113 and the curved third mounting groove 132 distributes the force acting on the cutting insert 100 in the positive or negative Y-axial direction during the cutting operation on the workpiece. A side wall 318 of the insert pocket 313 engages the second side face 160 to support the force acting on the cutting insert 100 in the positive X-axial direction. Accordingly, the cutting insert 100 can be firmed supported and clamped in the tool holder 310.

A cutting insert 200 according to a second embodiment is described with reference to FIG. 12. The cutting insert 200 according to the second embodiment has the same configuration as the cutting insert 100 according to the first embodiment with the exception of the following: the shape of a first mounting groove 213 formed on the first upper face 110; the shape of a second mounting groove 223 formed on the second upper face 120; the shape of a third mounting groove 232 formed on the first lower face 130; and the shape of a fourth mounting groove (not shown) formed on the second lower face 140.

The first mounting groove 213 linearly extends on the first upper face 110 from the right end of the first cutting portion 111 to the corner where the second lower face 140 and the second side face 160 meet. The first mounting groove 213 is inclined at a predetermined inclined angle α1 with respect to the second lower face 140. The second mounting groove 223 linearly extends on the second upper face 120 from the left end of the second cutting portion 121 to the corner where the first lower face 130 and the first side face 150 meet. The second mounting groove 223 is inclined at a predetermined inclined angle α2 with respect to the first lower face 130. The inclined angle α1 of the first mounting groove 213 and the inclined angle α2 of the second mounting groove 223 are the same so that the first cutting portion 111 and the second cutting portion 121 can be replaceable with each other.

Similar to the third mounting groove 132 of the cutting insert 100 according to the first embodiment, the third mounting groove 232 extends on the first lower face 130 from the left end of the cutting insert 200 to the corner where the second lower face 140 and the second side face 160 meet. Further, similar to the fourth mounting groove 142 of the cutting insert 100 according to the first embodiment, the fourth mounting groove extends on the second lower face 140 from the right end of the cutting insert 200 to the corner where the first lower face 130 and the first side face 150 meet. However, the third mounting groove 232 and the fourth mounting groove linearly extend. The third mounting groove is inclined at a predetermined inclined angle with respect to the second lower face 140. The fourth mounting groove is inclined at a predetermined inclined angle with respect to the first lower face 130. Since the first mounting groove 213 is inclined with respect to the second lower face 140 and the third mounting groove 232 is inclined with respect to the second lower face 140, the tool holder can firmly support the force acting on the cutting insert 200 in the positive or negative Y-axial direction.

A cutting insert 250 according to a third embodiment is described with reference to FIG. 13. The cutting insert 250 according to the third embodiment has the same configuration as the cutting insert 100 according to the first embodiment with the exception of the following: the shape of a first mounting groove 253 formed on the first upper face 110; the shape of a second mounting groove 263 formed on the second upper face 120; the shape of a third mounting groove 273 formed on the first lower face 130; and the shape of a fourth mounting groove (not shown) formed on the second lower face 140.

The first mounting groove 253 curvedly extends on the first upper face 110 from the right end of the first cutting portion 111 oppositely to the second cutting portion 121 (toward the second lower face 140). The left end of the first mounting groove 253 adjoins the right end of the first cutting portion 111. The right end of the first mounting groove 253 is located at the edge between the first upper face 110 and the second lower face 140 and is spaced from a corner 258 of the cutting insert 250 at which the second side face 160 and the second lower face 140 meet. The second mounting groove 263 curvedly extends on the second upper face 120 from the left end of the second cutting portion 121 oppositely to the first cutting portion 111 (toward the first lower face 130). The right end of the second mounting groove 263 adjoins the left end of the second cutting portion 121. The left end of the second mounting groove 263 is located at the edge between the second upper face 120 and the first lower face 130 and is spaced from a corner 259 of the cutting insert 250 at which the first side face 150 and the first lower face 130 meet. Similar to the third mounting groove 132 of the cutting insert 100 according to the first embodiment, the third mounting groove 273 of the cutting insert 250 curvedly extends on the first lower face 130 from the left end of the cutting insert 250 toward the second lower face 140. Further, similar to the fourth mounting groove 142 of the cutting insert 100 according to the first embodiment, the fourth mounting groove of the cutting insert 250 curvedly extends on the second lower face 140 from the right end of the cutting insert 250 toward the first lower face 130. The right end of the third mounting groove 273 of the cutting insert 250 is located at the edge between the first lower face 130 and the second lower face 140. The left end of the fourth mounting groove of the cutting insert 250 is located at the edge between the second lower face 140 and the first lower face 130.

A cutting tool assembly 300 according to a first embodiment is described with reference to FIGS. 14 to 18. The cutting tool assembly 300 according to the first embodiment includes the tool holder 310 and the cutting insert 100 according to the first embodiment.

As shown in FIGS. 14 and 15, the tool holder 310 includes an upper clamp 311, a lower clamp 312 and an insert pocket 313. The insert pocket 313 is formed between the upper clamp 311 and the lower clamp 312 and receives the cutting insert 100. The insert pocket 313 includes a side wall 318 which contacts the first side face 150 or the second side face 160 of the cutting insert 100.

The upper clamp 311 downwardly presses the cutting insert 100. The upper clamp 311 is configured such that its elastic restoring force always acts toward the lower clamp 312 when the upper clamp 311 is deformed in a direction away from the lower clamp 312. As shown in FIGS. 15 and 16, the upper clamp 311 includes a first mounting protrusion 315 which protrudes downwardly from a bottom surface 314 of the upper clamp 311. As shown in FIG. 17, the first mounting protrusion 315 curvedly extends with a predetermined radius of curvature r1. The first mounting protrusion 315 extends on the bottom surface 314 of the upper clamp 311 from the left end of the upper clamp 311 to the right end of the upper clamp 311. The first mounting protrusion 315 has an approximately semi-circular cross-sectional shape. The first mounting protrusion 315 is configured to engage the first mounting groove 113 of the cutting insert 100. Preferably, the radius of curvature r1 of the first mounting protrusion 315 is equal to the radius of curvature R1 of the first mounting groove 113.

The lower clamp 312 supports the cutting insert 100. The lower clamp 312 protrudes leftward further than the upper clamp 311. As shown in FIGS. 15 and 16, the lower clamp 312 includes a second mounting protrusion 317 which protrudes upwardly from a top surface 316 of the lower clamp 312. As shown in FIG. 18, the second mounting protrusion 317 curvedly extends with a predetermined radius of curvature r2. The second mounting protrusion 317 extends from the left end of the lower clamp 312 to the right end of the lower clamp 312. The second mounting protrusion 317 has an approximately semi-circular cross-sectional shape. The second mounting protrusion 317 is configured to engage the third mounting groove 132 of the cutting insert 100. Preferably, the radius of curvature r2 of the second mounting protrusion 317 is equal to the radius of curvature R3 of the third mounting groove 132.

To mount the cutting insert 100 to the insert pocket 313, in the state where the first upper face 110 with the first cutting portion 111 located thereon faces upward, the right end of the first mounting groove 113 and the right end of the third mounting groove 132 are brought into contact with the left end of the first mounting protrusion 315 and the left end of the second mounting protrusion 317 respectively. Subsequently, the cutting insert 100 is inserted rightward into the insert pocket 313. Then, as the first mounting protrusion 315 slides along the first mounting groove 113 and the second mounting protrusion 317 slides along the third mounting groove 132, the cutting insert 100 is moved into the insert pocket 313. When the second side face 160 of the cutting insert 100 comes into contact with the side wall 318 of the insert pocket 313, the insertion of the cutting insert 100 is finished. Since the upper clamp 311 presses the cutting insert 100 against the lower clamp 312 when the cutting insert 100 is mounted to the insert pocket 313, the cutting insert 100 is firmly clamped by the upper clamp 311 and the lower clamp 312. Further, the first mounting protrusion 315 and the second mounting protrusion 317 distributes the force acting on the cutting insert 100 in the positive or negative Y-axial direction during the cutting operation. Thus, the cutting insert 100 can be firmly supported and clamped in the insert pocket 313 of the tool holder 310. Furthermore, the cutting insert 100 can be more firmly clamped by the curved engagement between the first mounting protrusion 315 and the first mounting groove 113 as well as the curved engagement between the second mounting protrusion 317 and the third mounting groove 132. Alternatively, in case the cutting insert 100 is mounted to the insert pocket 313 of the tool holder 310 in the state where the second upper face 120 with the second cutting portion 121 located thereon faces upward, the first mounting protrusion 315 and the second mounting protrusion 317 are brought into engagement with the second mounting groove 123 and the fourth mounting groove 142 respectively.

A cutting tool assembly 400 according to a second embodiment is described with reference to FIG. 19. The cutting tool assembly 400 according to the second embodiment includes a tool holder 410 and the cutting insert 200 according to the second embodiment. The cutting tool assembly 400 according to the second embodiment has the same configuration as the cutting tool assembly 300 according to the first embodiment except the following: the shape of a first mounting protrusion 415 formed on the bottom surface 314 of the upper clamp 311; and the shape of a second mounting protrusion 417 formed on the top surface 316 of the lower clamp 312.

The first mounting protrusion 415 linearly extends on the bottom surface 314 from the left end of the upper clamp 311 to the right end of the upper clamp 311. The first mounting protrusion 415 has an approximately semi-circular cross-sectional shape. The first mounting protrusion 415 is configured to engage the first mounting groove 213 of the cutting insert 200. The first mounting protrusion 415 is inclined at an inclined angle with respect to the front surface and the rear surface of the upper clamp 311. Preferably, said inclined angle of the first mounting protrusion 415 is equal to the inclined angle α1 of the first mounting groove 213. The second mounting protrusion 417 linearly extends on the top surface 316 from the left end of the lower clamp 312 to the right end of the lower clamp 312. The second mounting protrusion 417 has an approximately semi-circular cross-sectional shape. The second mounting protrusion 417 is configured to engage the second mounting groove 223 of the cutting insert 200. The second mounting protrusion 417 is inclined at an inclined angle β1 with respect to the front surface and the rear surface of the lower clamp 312. Preferably, the inclined angle β1 of the second mounting protrusion 417 is equal to the inclined angle of the third mounting groove 232 of the cutting insert 200.

Referring to FIG. 20, a cutting tool assembly 500 according to a third embodiment includes a tool holder 510, a set screw 520 and the cutting insert 100 according to the first embodiment. The insert clamping portion of the tool holder 510 of the cutting tool assembly 500 is configured similarly to the insert clamping portion of the tool holder 310 of the cutting tool assembly 300 according to the first embodiment. The set screw 520 is positioned perpendicularly to the top surface of the upper clamp 311. The set screw 520 is fastened to the tool holder 510, pressing the upper clamp 311 toward the lower clamp 312. Thus, the cutting insert 100 can be more firmly clamped to the insert pocket 313. The insert clamping portion of the tool holder 510 of this embodiment may be configured similarly to the insert clamping portion of the tool holder 410 of the cutting tool assembly 400 according to the second embodiment. In such an example, the cutting insert 200 according to the second embodiment may be mounted to the tool holder 510 instead of the cutting insert 100 according to the first embodiment. Further, the insert clamping portion of the tool holder 510 of this embodiment may be configured such that the cutting insert 250 according to the third embodiment can be mounted to the tool holder 510.

Referring to FIG. 21, a cutting tool assembly 600 according to a fourth embodiment includes a cutter body 630 having a plurality of tool holders 610, and a plurality of the cutting inserts 100 according to the first embodiment mounted to the respective tool holders 610. The cutting tool assembly 600 shown in FIG. 21 may be used as a slotting cutter. The insert clamping portion of the tool holder 610 of the cutter body 630 is configured similarly to the insert clamping portion of the tool holder 310 of the cutting tool assembly 300 according to the first embodiment. The cutter body 630 has a shape of a circular saw blade and the tool holder 610 is provided in each position of saw teeth of such a shape of the cutter body 630. The cutting tool assembly 600 according to the fourth embodiment, wherein the cutting inserts 100 are applied to a slotting cutter, is capable of more deeply slotting the workpiece, when compared to a prior art slotting cutter. The insert clamping portion of the tool holder 610 of this embodiment may be configured similarly to the insert clamping portion of the tool holder 410 of the cutting tool assembly 400 according to the second embodiment. In such an example, the cutting insert 200 according to the second embodiment may be mounted to the tool holder 610. Further, the insert clamping portion of the tool holder 610 of this embodiment may be configured such that the cutting insert 250 according to the third embodiment can be mounted to the tool holder 610.

While the present invention has been described hereinbefore with reference to the foregoing embodiments depicted in the accompanying drawings, the present invention should not be limited thereto. It will be apparent to those of ordinary skill in the art that various substitutions, alternations or modifications may be made without departing from the scope of the present invention.

The invention claimed is:

1. A cutting insert, comprising:
   a first upper face and a first lower face disposed parallel to each other;
   a second upper face and a second lower face disposed parallel to each other and respectively perpendicular to the first upper face and the first lower face;
   a first side face located at one end of the first upper face, the first lower face, the second upper face and the second lower face;
   a second side face located at the other end of the first upper face, the first lower face, the second upper face and the second lower face;
   a first cutting portion including a first major cutting edge formed at an edge between the first upper face and the first side face;
   a second cutting portion including a second major cutting edge formed at an edge between the second upper face and the second side face;
   a first mounting groove extending on the first upper face from the other end of the first cutting portion oppositely to the second cutting portion along a longitudinal direction of the first upper face; and
   a second mounting groove extending on the second upper face from one end of the second cutting portion oppositely to the first cutting portion along a longitudinal direction of the second upper face.

2. The cutting insert of claim 1,
   wherein the first mounting groove curvedly extends from the other end of the first cutting portion toward a corner between the second lower face and the second side face, and
   wherein the second mounting groove curvedly extends from the one end of the second cutting portion toward a corner between the first lower face and the first side face.

3. The cutting insert of claim 1,
   wherein the first mounting groove linearly extends from the other end of the first cutting portion toward a corner between the second lower face and the second side face at an inclined angle α1 with respect to the second lower face, and
   wherein the second mounting groove linearly extends from the one end of the second cutting portion toward a corner between the first lower face and the first side face at an inclined angle α2 with respect to the first lower face.

4. The cutting insert of claim 1,
   wherein the first mounting groove curvedly extends from the other end of the first cutting portion toward the second lower face, and
   wherein the second mounting groove curvedly extends from the one end of the second cutting portion toward the first lower face.

5. The cutting insert of claim 1, further comprising:
   a third mounting groove extending on the first lower face from the one end of the first lower face along a longitudinal direction of the first lower face; and a fourth mounting groove extending on the second lower face from the other end of the second lower face along a longitudinal direction of the second lower face.

6. The cutting insert of claim 1,
wherein the first mounting groove has a cross-sectional shape having a curve, and
wherein the first mounting groove includes:
a pair of first curved surfaces having a radius of curvature; and
a second curved surface located between the pair of first curved surfaces and having a radius of curvature less than the radius of curvature of the first curved surface.

7. The cutting insert of claim 1,
wherein the second mounting groove has a cross-sectional shape having a curve, and
wherein the second mounting groove includes:
a pair of first curved surfaces having a radius of curvature; and
a second curved surface located between the pair of first curved surfaces and having a radius of curvature less than the radius of curvature of the first curved surface.

8. The cutting insert of claim 1, wherein the first cutting portion further comprises
first minor cutting edges extending from respective ends of the first major cutting edge along an edge between the first upper face and the second upper face and
an edge between the first upper face and the second lower face, and wherein
the first minor cutting edge forms an acute angle with respect to the first major cutting edge.

9. The cutting insert of claim 1, wherein the second cutting portion further comprises
second minor cutting edges extending from respective ends of the second major cutting edge along an edge between the second upper face and the first upper face and
an edge between the second upper face and the first lower face, and wherein
the second minor cutting edge forms an acute angle with respect to the second major cutting edge.

10. The cutting insert of claim 1, wherein a width of the cutting insert at the first major cutting edge is greater than a width of the cutting insert at the first upper face where the first cutting portion is not located.

11. A cutting tool assembly, comprising:
the cutting insert of claim 1; and
a tool holder configured to clamp the cutting insert,
wherein the tool holder comprises:
an upper clamp downwardly pressing the first upper face of the cutting insert, the upper clamp including a first mounting protrusion engaging the first mounting groove;
a lower clamp supporting the first lower surface of the cutting insert; and
an insert pocket receiving the cutting insert between the upper clamp and the lower clamp.

12. The cutting tool assembly of claim 11, wherein the first mounting protrusion downwardly protrudes from a bottom surface of the upper clamp and extends along a longitudinal direction of the bottom surface of the upper clamp.

13. The cutting tool assembly of claim 11, wherein the cutting insert further comprises
a third mounting groove extending from the one end of the first lower face along a longitudinal direction of the first lower surface, and wherein the lower clamp includes a second mounting protrusion engaging the third mounting groove of the cutting insert.

14. The cutting tool assembly of claim 13, wherein the second mounting protrusion upwardly protrudes from a top surface of the lower clamp and extends along a longitudinal direction of the top surface of the lower clamp.

15. The cutting tool assembly of claim 11, further comprising a set screw positioned perpendicularly to a top surface of the upper clamp, the set screw pressing the upper clamp downwardly.

16. The cutting tool assembly of claim 11,
wherein the cutting tool assembly is a slotting cutter, and
wherein the slotting cutter comprises a cutter body having a plurality of the tool holders.

17. A cutting insert, comprising:
a first upper face and a first lower face disposed parallel to each other;
a second upper face and a second lower face disposed parallel to each other and respectively perpendicular to the first upper face and the first lower face;
a first side face located at one end of the first upper face, the first lower face, the second upper face and the second lower face;
a second side face located at the other end of the first upper face, the first lower face, the second upper face and the second lower face;
a first cutting portion including a first major cutting edge formed at an edge between the first upper face and the first side face;
a second cutting portion including a second major cutting edge formed at an edge between the second upper face and the second side face;
a first mounting groove extending longitudinally on the first upper face, and opening out to the second side face;
a second mounting groove extending longitudinally on the second upper face, and opening out to the first side face.

18. The cutting insert of claim 17,
wherein the first mounting groove curvedly extends from the first cutting portion toward a corner between the second lower face and the second side face, and
wherein the second mounting groove curvedly extends from the second cutting portion toward a corner between the first lower face and the first side face.

19. The cutting insert of claim 17,
wherein the first mounting groove linearly extends from the first cutting portion toward a corner between the second lower face and the second side face at an inclined angle α1 with respect to the second lower face, and
wherein the second mounting groove linearly extends from the second cutting portion toward a corner between the first lower face and the first side face at an inclined angle α2 with respect to the first lower face.

20. The cutting insert of claim 17,
wherein the first mounting groove curvedly extends from the first cutting portion toward the second lower face, and
wherein the second mounting groove curvedly extends from the second cutting portion toward the first lower face.

* * * * *